United States Patent [19]
Makita et al.

[11] Patent Number: 5,733,660
[45] Date of Patent: Mar. 31, 1998

[54] GLASS PANE WITH REFLECTANCE REDUCING COATING

[75] Inventors: Kensuke Makita; Atsushi Takamatsu, both of Matsusaka, Japan

[73] Assignee: Central Glass Company, Limited, Yamaguchi, Japan

[21] Appl. No.: 445,138

[22] Filed: May 19, 1995

[30] Foreign Application Priority Data

May 20, 1994 [JP] Japan .................................. 6-130971
May 23, 1994 [JP] Japan .................................. 6-108668

[51] Int. Cl.$^6$ ...................................... B32B 15/00
[52] U.S. Cl. ...................... 428/426; 428/428; 428/432; 428/216; 428/34
[58] Field of Search .......................... 428/426, 428, 428/432, 216, 34; 359/586, 587, 590; 296/84.1

[56] References Cited

U.S. PATENT DOCUMENTS

| | | | |
|---|---|---|---|
| 5,106,671 | 4/1992 | Amberger | 428/215 |
| 5,194,990 | 3/1993 | Boulas | 359/587 |
| 5,318,830 | 6/1994 | Takamatsu | 428/216 |
| 5,342,676 | 8/1994 | Zagdoun | 428/216 |
| 5,403,368 | 4/1995 | Takahashi et al. | 65/17.2 |
| 5,413,865 | 5/1995 | Nakamura et al. | 428/432 |
| 5,496,621 | 3/1996 | Makita | 428/216 |

*Primary Examiner*—Timothy Speer
*Attorney, Agent, or Firm*—Evenson, McKeown, Edwards & Lenahan, PLLC

[57] ABSTRACT

The invention relates to a reflectance-reducing glass pane which may be a laminated glass pane such as an automobile front windshield. The invention provides a reflectance-reducing glass pane including: a transparent glass substrate having first and second major surfaces opposed to each other; a first reflectance-reducing coating formed on the first major surface of the glass substrate; and a second reflectance-reducing coating formed on the second major surface of the glass substrate. The first coating has at least two metal-oxide layers which are different in refractive index. The second coating has a refractive index of up to 1.50 and is made of one selected from the group consisting of $SiO_2$ and a mixture of $SiO_2$ and another metal oxide. The reflectance-reducing glass pane optionally further includes a third water-repellent coating which is formed on the second coating. The third coating comprises a silane compound containing a polyfluoroalkyl group. The reflectance of the glass pane is substantially low, with respect to a visible light incident on the glass pane from a side of the first coating at an incidence angle within a range from 40 to 80 degrees.

15 Claims, No Drawings

GLASS PANE WITH REFLECTANCE REDUCING COATING

BACKGROUND OF THE INVENTION

The present invention relates to a transparent glass pane having thereon a reflectance reducing coating. In particular, the glass pane is to be used as a vehicular window glass that is installed in an inclined position as in the case of a current automobile windshield, and the coating serves to reduce reflectance of visible light obliquely incident on the coated side of the glass pane.

There are various proposals of antireflection coatings for preventing or reducing the reflection of visible light from vehicular window glasses or windshields.

As a coating for the antireflection purpose, it is known to use a fluoride film and/or a laminate of a plurality of transparent oxide films which have different refractive indices. For example, JP 61-189501 A (1986) shows a three-layer coating made up of a first layer which is in contact with the glass surface and formed of $Al_2O_3$ or $CeF_3$ having a refractive index of 1.60–1.80, a second layer formed of a $ZrO_2/TiO_2$ mixture having a refractive index of 1.95–2.15 and a third layer which is formed of $MgF_2$ and has a refractive index of 1.30–1.45. JP 64-70701 A (1989) shows an antireflection three-layer coating which is electrically conductive and consists of a metal film coated on the glass surface as the first layer, a second layer which is a metal oxide film having a refractive index of 1.90–2.50 such as a $TiO_2$ film and a third layer which has a refractive index of 1.35–1.50 and is formed of either $SiO_2$ or $MgF_2$. As a modified way of using a fluoride, JP 3-17601 A (1991) proposes to form an antireflection coating by applying a solution of a metal oxide precursor such as a silicon alkoxide to a glass surface, heating the sol film on the glass surface to convert it into a gel film and further heating the gel film in a fluorine containing atmosphere to thereby form a metal oxide film containing fluoride of the metal. JP 3-23493 B (1991) discloses a low-reflectance and stainproof glass. In this glass, a first film is formed on a glass substrate and a second film is formed on the first film. The first film has a refractive index of at least 1.60 and is made of a condensate containing a metal oxide. The second film is made of a condensate of a fluorine-containing silicone compound having a polyfluorocarbon chain. This chain has at least two carbons to which fluorine atoms are bonded.

There is an increasing demand for a glass pane which is improved in reflectance reduction, as compared with conventional reflectance-reducing glass panes.

SUMMARY OF THE INVENTION

It is an object of the present invention to provide a transparent glass pane which is improved in reflectance is reduction.

According to a first aspect of the present invention, there is provided a reflectance-reducing glass pane comprising:

a transparent glass substrate having first and second major surfaces opposed to each other;

a first reflectance-reducing coating formed on the first major surface of said glass substrate, said first coating having at least two metal-oxide layers which are different in refractive index; and a second reflectance-reducing coating formed on the second major surface of said glass substrate, said second coating having a refractive index of up to 1.50 and being made of one selected from the group consisting of $SiO_2$ and a mixture of $SiO_2$ and another metal oxide.

When the glass pane of the invention is used as an automobile front windshield, the glass pane is positioned such that the first coating is on the side of an automobile interior (passenger's cabin) and that the second coating is on the side of an automobile exterior. According to the invention, the first and second reflectance-reducing coatings are constructed such that, with respect to the visible light incident on the first coating from the automobile interior at an incidence angle in the range from 40 to 80 degrees, the reflectance of the coated glass pane is lower than the reflectance of the glass substrate without any coating by 4.5 to 7.0%.

The first and second coatings themselves are colorless or almost colorless. Therefore, when the coated glass pane is used as a vehicular windshield or window glass, the first and second coatings do not give an unpleasant or strange impression to persons on or outside the vehicle.

In the present invention, particular attention is paid to the incidence of visible light at an angle of 40°–80° with a normal to the glass pane, because light from the dashboard is liable to impinge on the inside of the windshield at an incidence angle of about 40°–80°. Since the first and second coatings according to the is present invention reduce the reflectance of the windshield for such obliquely incident visible light by 4.5–7.0%, the reflection of the dashboard in the windshield becomes almost inappreciable to the driver or the occupant of the next seat. This is very favorable for the safety of driving and also for the comfort of the passengers.

In the invention, it is optional to form a third water-repellent coating on the second coating. This third coating is made of a silane compound containing a polyfluoroalkyl group. The third coating is superior in water repellency, oil repellency, adhesion, abrasion resistance and weatherability. Furthermore, the third coating is stainproof.

According to the invention, it is preferable that the second coating has a minutely rough surface. With this, the bonding between the second and third coatings is much more improved, and abrasion resistance of the third coating is also improved.

According to the invention, in case that the third coating is used, the second coating may be omitted. In other words, the third coating may be directly formed on the second major surface of the glass substrate, in addition to the formation of the first coating on the first major surface of the glass substrate.

DESCRIPTION OF THE PREFERRED EMBODIMENTS

A reflectance-reducing glass pane according to the present invention will be described in the following. This glass pane comprises: a transparent glass substrate having first and second major surfaces opposed to each other; a first reflectance-reducing coating formed on the first major surface of the glass substrate; and a second reflectance-reducing coating formed on the second major surface of said glass substrate.

The first coating has at least two metal-oxide layers which are different in refractive index. With this, the first coating serves to reduce the reflectance of the glass pane. The first coating may be a conventional reflectance-reducing coating as long as it has at least two metal-oxide layers which are different in refractive index. The top layer of the first coating, which is exposed, for example, to the automobile interior, may be the same as the second coating in structure such as refractive index, thickness and type of metal oxide.

Preferred examples of the first coating are as follows. In case that the first coating is made up of first and second metal-oxide layers, the first layer directly formed on the glass substrate, for example, is made of a mixture of $SiO_2$ and $TiO_2$ and has a refractive index within a range from 1.70 to 1.80 and a thickness within a range from 90 to 110 nm; and the second layer directly formed on the first layer, for example, is made of $SiO_2$ and has a refractive index of about 1.45 and a thickness within a range from 105 to 130 nm. In case that the first coating is made up of first, second and third metal-oxide layers, the first layer directly formed on the glass substrate, for example, is made of a mixture of $SiO_2$ and $TiO_2$ and has a refractive index within a range from 1.70 to 1.80 and a thickness within a range from 90 to 110 nm; and the second layer directly formed on the first layer, for example, is made of $TiO_2$ or a mixture of $TiO_2$ and $SiO_2$ and has a refractive index within a range from 2.05 to 2.20 and a thickness within a range from 110 to 150 nm; and the third layer directly formed on the second layer, for example, is made of $SiO_2$ and has a refractive index of about 1.45 and a thickness within a range from 105 to 130 nm.

The second coating has a refractive index of up to 1.50 (more preferably up to 1.47) and is made of one selected from the group consisting of $SiO_2$ and a mixture of $SiO_2$ and another metal oxide. In a preferred embodiment, the second coating has a refractive index within a range from 1.43 to 1.47, and a thickness within a range from 105–130 nm. The refractive index (up to 1.50) of the second coating is lower than the refractive indices (1.51–1.53) of conventional soda-lime-silica glass plates which are generally used for automobiles and buildings. Examples of the above another metal oxide are $TiO_2$, $ZrO_2$, $Al_2O_3$, $B_2O_3$, $SnO_2$, $In_2O_3$, $Ta_2O_3$ and the like. One of these examples or mixtures of these examples may be used as the another metal oxide. It is preferable to form the second coating by a sol-gel process using a silicon alkoxide or a mixture of a silicon alkoxide and an alkoxide of another metal such as Ti, Zr, Al, B, Sn, In or Ta.

According to the invention, adhesion of the first and second coatings to the glass substrate is satisfactory. Furthermore, bonding between the at least two layers of the first coating is also satisfactory. The first and second coatings are superior in abrasion resistance and durability.

The transparent glass substrate may be an organic glass, and colorless or colored. It is optional to use a tempered or partly tempered glass sheet. Irrespective of the type of the glass, either of a flat glass pane or a curved glass pane can be used. Furthermore, the glass substrate may be either a multiple glass or a laminated glass.

The inventors unexpectedly found that the reflectance of the glass pane significantly reduces by the formation of the second coating on the second major surface of the glass substrate, in addition to the formation of the first coating on the first major surface of the glass substrate.

The glass pane according to the invention may be used as, for example, an automobile front windshield. In this case, it is preferable to position the glass pane in such a manner that the first and second coatings are respectively on the side of the automobile interior (passenger's cabin) and on the side of the automobile exterior. Under this condition, the reflectance of the visible light which has impinged on the first coating from the automobile interior and then has been transmitted through the first coating, on the second major surface of the glass substrate, is reduced by the second coating formed on the second major surface. Thus, the reflectance of the glass pane of the invention becomes lower than that of a conventional reflectance-reducing glass pane having thereon only the first coating, by from about 0.5 to about 2.0%. Therefore, the reflection of the image of a dashboard in the front windshield according to the invention becomes more inappreciable to the driver or the occupant of the next seat, as compared with a conventional front windshield.

A method of preparing a reflectance-reducing glass pane according to the invention comprises the steps of:

(a) forming the first reflectance-reducing coating on the first major surface of the glass substrate;

(b) applying a first coating solution to the second major surface of said glass substrate so as to form a first sol film thereon; and (c) heating the first sol film at a temperature of at least 400° C. so as to turn the first sol film into the second coating which is a metal oxide film.

In the invention, it is optional to form a third coating on the second reflectance-reducing coating. This third coating is a water-repellent coating and made of a silane compound containing a polyfluoroalkyl group. The third coating has a thickness within a range from a thickness of monomolecular layer of the silane compound to a thickness of one hundred molecules of the silane compound. Examples of the silane compound of the invention are silane compounds each of which contains a perfluoroalkyl group having a carbon number of from 1 to 20, such as $CF_3(CH_2)_2Si(OCH_3)_3$, $CF_3(CF_2)_5(CH_2)_2Si(OCH_3)_3$, $CF_3(CF_2)_7(CH_2)_2Si(OCH_3)_3$, $CF_3(CF_2)_7(CH_2)_2SiCH_3(OCH_3)_2$, $CF_3(CF_2)_3(CH_2)_2Si(OCH_3)_3$ and $CF_3(CF_2)_7(CH_2)_2SiCl_3$. Furthermore, other examples of the silane compound of the invention are condensates prepared by hydrolyzing the above silane compounds.

In the invention, the third coating is formed by applying a coating solution containing the silane compound to the second coating so as to form a sol film thereon and by heating this sol film at a temperature not higher than 400° C. so as to turn the sol film into the third coating.

It is preferable that the second coating has a minutely rough surface. To make the second coating's surface minutely rough, it is suitable to use a method disclosed in U.S. Pat. No. 5,403,368 of which disclosure is incorporated herein by reference. In this method, at first, at least two sols are respectively prepared from at least one compound selected from the group consisting of metal alkoxides and metal acetylacetonates, so as to disperse therein at least two polymers of the at least one compound. The at least two polymers have different average molecular weights. Then, the at least two sols are mixed with a solvent so as to prepare a coating solution. Then, this coating solution is applied to a glass substrate so as to form thereon a sol film. Then, the sol film is heated to transform the sol film into a metal oxide film which has numerous micro-pits thereon and thus is made minutely rough.

To apply a coating solution containing a silane compound having a polyfluoroalkyl group to the second coating having a minutely rough surface, it is possible to use a method disclosed in U.S. Pat. No. 5,413,865 of which disclosure is incorporated herein by reference. In the invention, it is preferable that the coating solution for preparing the third coating penetrates into the micro-pits of the second coating. With this, the third coating is much more improved in water repellency and abrasion resistance, and bonding between the second and third coatings is much more improved.

The size of the micro-pits formed on the second coating is smaller than the wavelength of the visible light. Therefore, the presence of the micro-pits does not deteriorate the transparency of the glass pane of the invention. Furthermore, the silane compound containing a polyfluoroalkyl group of the third coating is colorless and transparent; the refractive index of the third coating is as low as a range from about 1.33 to about 1.35 because the polarizability of fluorine atom is small; and the third coating has a thickness within a range from a thickness of monomolecular layer of the silane compound to a thickness of one hundred molecules of the silane compound. Therefore, the presence of the third coating does not deteriorate the transparency of the glass pane of the invention.

The following nonlimitative examples are illustrative of the present invention.

EXAMPLE 1

In this example, the first and second coatings were formed on a laminated glass pane to be used as an automobile front windshield. In fact, the first coating was formed on the inside of the inside glass plate of the laminated glass pane, and the second coating was formed on the outside of the outside glass plate of the same.

At first, a mixed alkoxide solution was prepared by mixing a titanium alkoxide and a silicon alkoxide in a proportion of about 43 to about 57 by mol on an oxide basis. Then, isopropyl alcohol as a solvent was added to the mixed alkoxide solution to get a solute concentration of about 0.45 mol/l. The thus prepared alkoxide solution had a viscosity of about 2 mPa.s (cP).

Separately, a bronze-colored float glass substrate (the inside glass plate) having widths suitable for an automobile front windshield and a thickness of about 2 mm was washed with neutral detergent, then water, then alcohol and then acetone. The thus washed glass substrate was dried, and then one major surface of the glass substrate was covered with a masking tape. Then, the glass substrate was immersed in the above alkoxide solution and then drawn up from the solution at a constant rate of about 3.0 mm/s. The coated glass substrate was allowed to stand still to form a gel film on the glass substrate. Then, the masking tape was removed from the glass substrate. Then, the glass substrate was heated in an electrical furnace at a temperature of about 280° C. so as to turn the gel film to a film of a mixture of $SiO_2$ and $TiO_2$ as a first layer of the first coating. Then, the uncoated surface of the glass substrate was again covered with a masking tape. Then, the glass substrate was immersed in a silicon alkoxide solution having a solute concentration of about 0.25 mol/l and a viscosity of about 6 mPa.s. Then, the glass substrate was drawn up from the silicon alkoxide solution at a constant rate of about 4 mm/s. Then, the masking tape was removed, and then the glass substrate was heated at a temperature of about 280° C. for about 10 min, thereby obtaining a film of $SiO_2$ as a second layer of the first coating.

Separately, a clear glass substrate (the outside glass plate) having widths suitable fog an automobile front windshield and a thickness of 2 mm was washed and then dried, in the same manner as the inside glass plate. Then, one major surface of the outside glass plate was covered with a masking tape. Then, this glass plate was immersed in the same silicon alkoxide solution as above, and then the glass plate was drawn up from the solution at a constant rate of about 4.0 mm/s. Then, the masking tape was removed from the glass plate, and then the glass plate was heated in an electrical furnace at a temperature of about 280° C. for about 10 min, thereby forming a film of $SiO_2$ (the second coating) on the outside glass plate.

The thus coated inside and outside glass plates for a laminated glass plate were sent to a production line for an automobile front windshield. In this production line, these glass plates were cut to have certain predetermined shapes. Then, these glass plates were united so as to expose the first and second coatings, and then the united glass plates were bent in a direction toward the side of the inside glass plate. With this, the glass plates were suitably bent to be used as an automobile front windshield. Then, one pair of the glass plates was taken and cut into small pieces. Then, optical characteristics of the first and second coatings were measured using these pieces. In this measurement, the first and second layers of the first coating respectively had refractive indices of about 1.75 and about 1.45 and thicknesses of about 100 nm and about 118 nm, and the second coating had a refractive index of about 1.45 and a thickness of about 118 nm.

Another pair of the glass plates which had been bent as above was united with each other with an interposal of a polyvinyl butyral (PVB) interlayer film therebetween. This pair with the PVB film was heated in an autoclave under pressure so as to prepare a laminated glass pane for an automobile front windshield.

Then, the visible light reflectance of the laminated glass pane was measured with a spectrophotometer, with respect to the visible light from the side of an automobile interior, which is incident on the first coating at an angle of about 60°. Similarly, in each of the following Examples 2–6 and Comparative Examples 1–3, the visible light reflectance of the laminated glass pane was measured with respect to the visible light from the side of an automobile interior. In the measurement, the visible light reflectance was about 9.3%. Furthermore, this measurement was also conducted on a laminated glass pane which had been prepared as above, but does not have any coating thereon. In this measurement, the visible light reflectance was about 15.4%.

A Taber test as an abrasion resistance test was conducted on the second coating of the laminated glass pane, In this test, an abrasive wheel (CS-10F) was rotated 1,000 times. After this test, the haze value was about 1%. Therefore, the second coating proved to be superior in abrasion resistance.

EXAMPLE 2

In this example, Example 1 was repeated except in that three metal-oxide layers as the first coating were formed on the inside glass plate as follows.

At first, the process of forming the first layer of the first coating on the inside glass plate was repeated in accordance with Example 1, except in that the inside glass plate immersed in the alkoxide solution was drawn up at a constant rate of about 3.2 mm/s.

Then, a second layer of the first coating was formed on the first layer as follows. At first, a mixed alkoxide solution was prepared by mixing a titanium alkoxide and a silicon alkoxide in a proportion of about 93 to about 7 by mol on an oxide basis. Then, isopropyl alcohol as a solvent and a very small amount of about 0.3 wt % hydroxypropylcellulose were added to the mixed alkoxide solution to get a sol having a solute concentration of about 0.45 mol/l. The thus prepared sol had a viscosity of about 7 mPa.s. Then, the uncoated major surface of the inside glass plate was covered with a masking tape. Then, the glass plate was immersed in this sol, and then drawn up at a constant rate of about 2.8 mm/s. Then, the masking tape was removed. Then, the glass plate was heated in an electrical furnace at a temperature of about 280° C. for about 10 min, thereby forming a second layer of a mixture of $SiO_2$ and $TiO_2$ on the first layer.

Then, the process of forming the second layer of the first coating according to Example 1 was repeated so as to form a third layer on the second layer, except in that the inside glass plate was drawn up at a constant rate of about 3.8 mm/s. Then, the process of forming the second coating on the outside glass plate was repeated in accordance with Example 1.

Then, optical characteristics of the first and second coatings were measured, as in Example 1. In this measurement, the first, second and third layers of the first coating respectively had refractive indices of about 1.75, about 2.10 and about 1.45 and thicknesses of about 105 nm, about 135 nm and about 115 nm.

Then, the visible light reflectance of the laminated glass pane was measured with a spectrophotometer, with respect to the visible light incident on the first coating at an angle of about 65°. In this measurement, the visible light reflectance was about 13.8%. Furthermore, this measurement was also conducted on a laminated glass pane which had been prepared as above, but does not have the first and second coatings thereon. In this measurement, the visible light reflectance was about 19.9%.

EXAMPLE 3

In this example, Example 1 was repeated except in that first and second coatings were respectively formed on first and second major surfaces of a single glass plate having a thickness of about 8 mm.

A first layer of the first coating was formed as follows. At first, a mixed alkoxide solution was prepared by mixing a zirconium alkoxide and a silicon alkoxide in a proportion of about 67 to about 33 by mol on an oxide basis. Then, a mixed solvent containing isopropyl alcohol and ethyl cellosolve was added to the mixed alkoxide solution and the mixture was stirred to get a sol having a solute concentration of about 0.3 mol/l. The thus prepared sol had a viscosity of about 2.5 mPa.s. Then, the glass plate was sufficiently washed and then dried as in Example 1. Then, the second major surface of this glass plate was covered with a masking tape. Then, the glass plate was immersed in the sol, and then drawn up at a constant rate of about 3.0 mm/s. Then, the masking tape was removed. Then, the glass plate was heated in an electrical furnace at a temperature of about 350° C. for about 15 min, thereby forming a first layer of a mixture of $SiO_2$ and $ZrO_2$ on the first major surface of the glass plate.

Then, the thus coated glass plate having no masking tape thereon was immersed in the same sol as that for preparing the second coating of Example 1, and then drawn up at a constant rats of about 4.5 mm/s. Then, the thus coated glass plate was heated at a temperature of about 350° C. for about 15 min, thereby forming a second layer ($SiO_2$) on the first layer and a second coating ($SiO_2$) on the second major surface of the glass plate. Then, the glass plate was baked at a temperature of about 550° C. for about 30 min and then annealed.

Then, optical characteristics of the first and second coatings of the glass plate were measured, as in Example 1. In this measurement, the first and second layers of the first coating respectively had refractive indices of about 1.75 and about 1.45 and thicknesses of about 100 nm and about 120 nm, and the second coating had a refractive index of about 1.45 and a thickness of about 120 nm.

Then, the visible light reflectance of the glass plate was measured with a spectrophotometer, with respect to the visible light incident on the first coating at an angle of about 50°. In this measurement, the visible light reflectance was about 5.3%. Furthermore, this measurement was also conducted on a single glass plate which had been prepared as above, but does not have any coating thereon. In this measurement, the visible light reflectance was about 10.7%.

COMPARATIVE EXAMPLE 1

In this comparative example, Example 1 was repeated except in that the second coating on the outside glass plate was omitted. In fact, only the first and second layers of the first coating were formed on the inside glass plate.

The visible light of the thus prepared laminated glass pane and the laminated glass pane having no coating thereon were respectively about 11.4% and about 15.4%, with respect to the visible light incident on the first coating at an angle of about 60°.

COMPARATIVE EXAMPLE 2

In this comparative example, Example 2 was repeated except in that the second coating on the outside glass plate was omitted. In fact, only the first, second and third layers of the first coating were formed on the inside glass plate.

The visible light reflectances of the thus prepared laminated glass pane and the laminated glass pane having no coating thereon were respectively about 16.0% and about 19.9%, with respect to the visible light incident on the first coating at an angle of about 65°.

COMPARATIVE EXAMPLE 3

In this comparative example, Example 3 was repeated except in that the second coating on the second major surface of the single glass plate was omitted by covering the second major surface with a masking tape. In fact, only the first and second layers of the first coating were formed on the single glass plate.

The visible light reflectances of the thus prepared single glass plate and the single glass plate having no coating thereon were respectively about 7.2% and about 10.7%, with respect to the visible light incident on the first coating at an angle of about 50°.

EXAMPLE 4

In this example, Example 1 was repeated except in that another type of the second coating was formed on the outside glass plate and that the third coating was further formed on the second coating, as follows.

The same first coating as that of Example 1 was formed on the inside glass plate in accordance with Example 1.

A coating solution for preparing the second coating was prepared as follows. At first, a first silica sol having a weight average molecular weight of about 126,000 was prepared by hydrolyzing and polycondensing tetraethoxysilane. Separately, a second silica sol having a weight average molecular weight of about 3,200 was prepared by hydrolyzing and polycondensing monomethyltriethoxysilane. Then, a mixed silica sol was prepared by mixing the first and second silica sols in a proportion of about 1 to about 3.5 on an oxide basis. The prepared mixed silica sol had a solute concentration of about 0.4 mol/l and a viscosity of about 2.5 mPa.s. Then, the same clear glass plate as that of Example 1, of which glass plate one surface had been covered with a masking tape, was immersed in the mixed silica sol and drawn up at a constant rate of about 4.5 mm/s. Then, the coated glass plate was heated in an electrical furnace at a temperature of about 280° C. for about 10 min, thereby forming a film of $SiO_2$ (the second coating) on the outside glass plate.

Optical characteristics of the first and second coatings were measured as in Example 1. In this measurement, the first and second layers of the first coating had the same refractive indices and the same thicknesses as those of Example 1, and the second coating had a refractive index of about 1.45 and a thickness of about 120 nm.

Another pair of the glass plates which had been bent as in Example 1 was separated from each other. Separately, a solution for the third coating was prepared by hydrolyzing the silane compound containing a polyfluoroalkyl group. Then, about 10 cc of this solution was dropped with a dropping pipette onto the second coating of the above another pair. Then, the dropped solution was uniformly extended by rubbing a flannel against the second coating so as to form a thin film thereon. Then, the thus coated outside glass plate was heated in an electrical furnace at a temperature of about 250° C. for about 30 min so as to form the third coating. The thus prepared third coating had a thickness within a range from a thickness of monomolecular layer of the silane compound to a thickness of one hundred molecules of the silane compound.

Then, a laminated glass pane for an automobile front windshield was prepared as in Example 1, using the thus prepared the inside and outside glass plates.

Then, the visible light reflectance of the laminated glass pane was measured with a spectrophotometer, with respect to the visible light incident on the first coating at an angle of about 60°. In the measurement, the visible light reflectance of the laminated glass pane of the invention and that of a laminated glass pane which had been prepared as above but does not have any coating thereon were respectively the same as those of Example 1.

The contact angle of water drop on the third coating on the outside glass plate was measured with a contact angle meter called CA-A type made by Kyowa Kaimen Kagaku Co. In this measurement, the contact angle was in a range from about 110 to about 115 degrees which means a high water-repellency. Furthermore, stains such as oils and fats were easily wiped off by a cloth moistened with alcohol. After this wipe, a stain of alcohol did not remain on the outside glass plate.

Due Panel Weather (D.P.W) accelerated weatherability test was conducted on the third coating of the laminated glass pane. The result of this test was satisfactory. Furthermore, a so-called traverse test as an abrasion resistance test was conducted on the third coating. In this test, a broad cloth of #40 was kept in contact with the third Coating and moved reciprocatively until it made about 1,000 successive rubbing passes under a load of about 100 g/cm². The result of this test was satisfactory.

EXAMPLE 5

In this example, the first coating consisting of the first, second and third layers was formed on an inside glass plate in accordance with Example 2, and the second and third coatings were formed on an outside glass plate in accordance with Example 4.

The first, second and third layers of the first coating had respectively the same refractive indices and the same thicknesses as those of Example 2. The visible light reflectance was the same as that of Example 2, with respect to the visible light incident on the first coating at an angle of about 65°. The contact angle of water drop on the third coating was measured as in Example 4. In this measurement, the contact angle was in a range from about 110 to about 115 degrees. Furthermore, stains such as oils and fats were easily wiped off by a cloth moistened with alcohol. After this wipe, a stain of alcohol did not remain on the third coating. The same weatherability test and the same abrasion resistance test as those of Example 4 were conducted on the third coating. The results of these tests were satisfactory.

EXAMPLE 6

In this example, the first and second coatings were respectively formed on the inside and outside major surfaces of a single glass plate in accordance with Example 3. Furthermore, the third coating was formed on the second coating in accordance with Example 4 except in that the coated single glass plate was heated at a temperature of about 350° C. for about 20 min.

The first and second layers of the first coating and the second coating had respectively the same refractive indices and the same thicknesses as those of Example 3. The visible light reflectance was the same as that of Example 3, with respect to the visible light incident on the first coating at an angle of about 50°. The contact angle of water drop on the third coating on the outside glass plate was measured as in Example 4. In this measurement, the contact angle was in a range from about 110 to about 115 degrees.

What is claimed is:

1. A reflectance-reducing glass pane comprising:
    a transparent glass substrate having first and second major surfaces opposed to each other;
    a first reflectance-reducing coating formed directly on the first major surface of said glass substrate, said first coating having at least two metal-oxide layers which are different in refractive index; and
    a surface reflectance-reducing coating formed directly on the second major surface of said glass substrate, said second coating having a refractive index within a range from 1.43 to 1.47 and a thickness within a range from 105–130 nm, and being made of a member selected from the group consisting of $SiO_2$ and a mixture of $SiO_2$ and another metal oxide.

2. A glass pane according to claim 1, wherein said second coating is a single layer.

3. A glass pane according to claim 1, wherein said glass substrate has a pair of glass plates which are bonded together with an interlayer film therebetween.

4. A glass pane according to claim 3, wherein the glass pane is a front windshield of an automobile, and wherein said first coating is on an interior side of the automobile and said second coating is on an exterior side of the automobile.

5. A glass pane according to claim 1, wherein said first coating is constructed such that, with respect to a visible light incident on the glass pane from a side of said first coating at a particular incidence angle, a reflectance of the glass pane is reduced.

6. A glass pane according to claim 5, wherein the particular incidence angle is within a range from 40 to 80 degrees, and wherein the reflectance of the glass pane is lower than a reflectance of the glass substrate without the first and second coatings, by 4.5–7.0%.

7. A glass pane according to claim 1, wherein said first and second coating are prepared by a sol-gel process using a solution containing at least one organic metal compound.

8. A glass pane according to claim 1, wherein the another metal oxide is at least one selected from $TiO_2$, $ZrO_2$, $Al_2O_3$, $B_2O_3$, $SnO_2$, $In_2O_3$, $Ta_2O_5$ and mixtures thereof.

9. A glass pane according to claim 1, wherein said first coating has first and second metal-oxide layers.

10. A glass pane according to claim 1, wherein said first coating has first, second and third metal-oxide layers.

11. A glass pane according to 1, wherein material of a top layer of said first coating is the same as material of said second coating.

12. A glass pane according to claim 1, further comprising a third water-repellent coating formed on the second coating, the third coating comprising a silane compound containing a polyfluoroalkyl group.

13. A reflectance-reducing glass pane comprising:

a transparent glass substrate having first and second major surfaces opposed to each other;

a first reflectance-reducing coating formed directly on the first major surface of said glass substrate, said first coating having at least two metal-oxide layers which are different in refractive index;

a second reflectance-reducing coating formed directly on the second major surface of said glass substrate, said second coating having a refractive index within a range from 1.43 to 1.47 and a thickness within a range from 105–130 nm, and being made of a member selected from the group consisting of $SiO_2$ and a mixture of $SiO_2$ and another metal oxide; and a third water-repellent coating formed directly on the second coating, the third coating comprising a silane compound containing a polyfluoroalkyl group.

14. A glass pane according to claim 13, wherein the third coating has a thickness within a range from a thickness of monomolecular layer of the silane compound to a thickness of one hundred molecules of the silane compound.

15. A glass pane according to claim 13, wherein the second coating has a minutely rough surface having numerous micro-pits thereon.

* * * * *